(12) United States Patent
Bosshard et al.

(10) Patent No.: US 11,546,053 B2
(45) Date of Patent: Jan. 3, 2023

(54) METHOD FOR MULTIBEAM COVERAGE BY THE GROUPING OF ELEMENTARY BEAMS OF THE SAME COLOUR, AND TELECOMMUNICATIONS PAYLOAD FOR IMPLEMENTING SUCH A METHOD

(71) Applicant: THALES, Courbevoie (FR)

(72) Inventors: Pierre Bosshard, Toulouse (FR); Didier Le Boulc'h, Toulouse (FR)

(73) Assignee: THALES, Courbevoie (FR)

( * ) Notice: Subject to any disclaimer, the term of this patent is extended or adjusted under 35 U.S.C. 154(b) by 258 days.

(21) Appl. No.: 16/226,522

(22) Filed: Dec. 19, 2018

(65) Prior Publication Data

US 2019/0199433 A1 Jun. 27, 2019

(30) Foreign Application Priority Data

Dec. 21, 2017 (FR) ...................... 1701345

(51) Int. Cl.
| | |
|---|---|
| *H04B 7/185* | (2006.01) |
| *H04B 7/204* | (2006.01) |
| *H04B 17/336* | (2015.01) |
| *H04W 72/04* | (2009.01) |
| *H04W 72/08* | (2009.01) |
| *H04W 84/06* | (2009.01) |

(52) U.S. Cl.
CPC ....... *H04B 7/2041* (2013.01); *H04B 7/18515* (2013.01); *H04B 17/336* (2015.01); *H04W 72/0453* (2013.01); *H04W 72/0486* (2013.01); *H04W 72/085* (2013.01); *H04W 84/06* (2013.01)

(58) Field of Classification Search
CPC .............. H04B 7/1851; H04B 7/18513; H04B 7/18515; H04B 7/2041; H01Q 25/007; H01Q 19/17; H01Q 19/175; H04W 84/06
See application file for complete search history.

(56) References Cited

U.S. PATENT DOCUMENTS 3,541,553 A * 11/1970 Gubin .................. H04B 7/2041
                                                                342/353
6,018,316 A *  1/2000 Rudish .................... H01Q 1/288
                                                                342/361

(Continued)

FOREIGN PATENT DOCUMENTS

| DE | 100 21 112 A1 | 11/2001 | |
|---|---|---|---|
| DE | 10021112 A1 * | 11/2001 | ............. H04B 7/204 |
| FR | 3058578 A1 * | 5/2018 | ........... H01Q 25/007 |

OTHER PUBLICATIONS

Machine Language Translation of DE10021112A1.*

*Primary Examiner* — Gregory C. Issing
(74) *Attorney, Agent, or Firm* — BakerHostetler

(57) ABSTRACT

A method for multibeam coverage of a region of the surface of the Earth includes the generation, by a telecommunications payload embedded on a satellite, of a plurality of radiofrequency beams, called elementary beams; the formation of a plurality of radiofrequency beams, called composite beams, exhibiting footprints on the ground of different sizes, each the composite beam being obtained by the grouping of one or more elementary beams; and the transmission or the reception of data through the composite beams, identical data being transmitted or received through all the elementary beams forming one and the same composite beam.

11 Claims, 5 Drawing Sheets

(56) References Cited

U.S. PATENT DOCUMENTS

| | | | | |
|---|---|---|---|---|
| 6,441,785 B1* | 8/2002 | Rosen | ............... | H01Q 3/26 |
| | | | | 342/158 |
| 6,813,492 B1* | 11/2004 | Hammill | ............ | H04B 7/2041 |
| | | | | 455/12.1 |
| 7,706,787 B2* | 4/2010 | Malarky | ............ | H04B 7/18515 |
| | | | | 455/429 |
| 7,768,956 B2* | 8/2010 | Fenech | ............ | B64G 1/1007 |
| | | | | 370/316 |
| 9,705,586 B2* | 7/2017 | Wang | ............ | H04B 7/2041 |
| 9,848,370 B1* | 12/2017 | Freedman | ............ | H04B 7/18515 |
| 2017/0181160 A1 | 6/2017 | Corbel et al. | | |
| 2017/0289822 A1 | 10/2017 | Hreha et al. | | |
| 2019/0199432 A1* | 6/2019 | Bosshard | ............ | H01Q 21/24 |
| 2019/0199433 A1* | 6/2019 | Bosshard | ............ | H04B 7/2041 |

\* cited by examiner

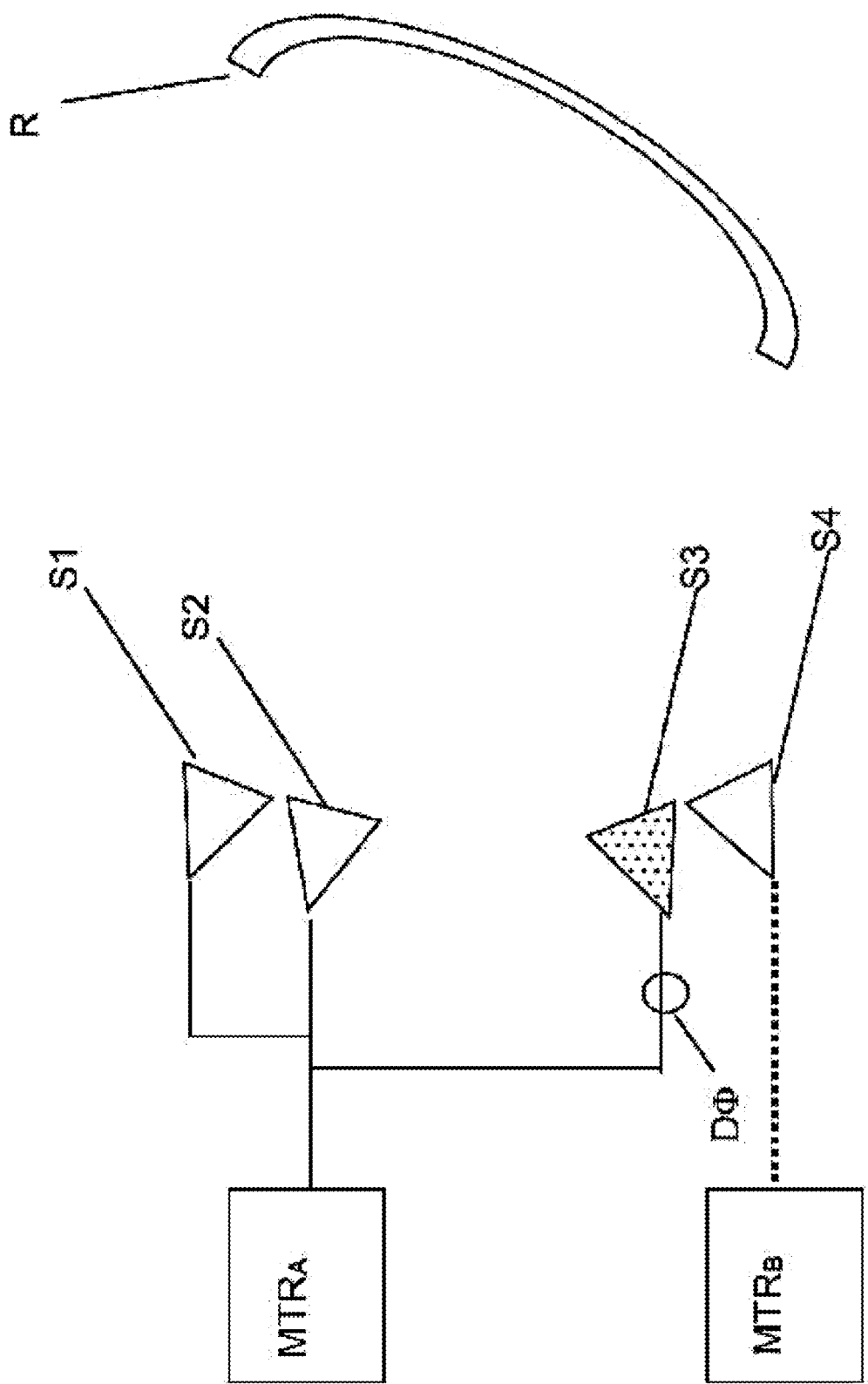

METHOD FOR MULTIBEAM COVERAGE BY THE GROUPING OF ELEMENTARY BEAMS OF THE SAME COLOUR, AND TELECOMMUNICATIONS PAYLOAD FOR IMPLEMENTING SUCH A METHOD

CROSS-REFERENCE TO RELATED APPLICATIONS

This application claims priority to foreign French patent application No. FR 1701345, filed on Dec. 21, 2017, the disclosure of which is incorporated by reference in its entirety.

FIELD OF THE INVENTION

The invention relates to the field of satellite telecommunications. More particularly, it relates to a method for producing a multibeam coverage of a region of the surface of the Earth, and to a telecommunications payload, intended to be embedded on a satellite, making it possible to implement such a method.

BACKGROUND

The search for high transmission capacities in the satellite communications systems dictates the use of antennas with multiple beams for producing so-called "multibeam" coverages of a region of interest of the surface of the Earth. Such coverage takes the form of a juxtapositioning of geographically distinct individual coverages, contiguous or not contiguous, generally of circular or elliptical form and corresponding to the footprints on the ground of different beams generated by a telecommunications satellite. It should be noted that the term "beam" can cover two distinct realities: when considering a downlink, this effectively concerns beams of electromagnetic radiation being propagated from the satellite to the ground; in the case of an uplink, on the other hand, "beam" denotes a lobe of the reception pattern of the antenna system of the satellite.

The multibeam coverages generally allow for the re-use of the frequency according to a so-called "N-colour" scheme. According to such a scheme, in order to avoid interferences, two adjacent beams have a different "colour", each "colour" corresponding to a pairing of frequency and polarization state.

The disparity in data traffic means between different parts of the region of interest can be very significant; it is therefore necessary to vary the size of the beams serving these different parts. Thus, it is common practice to use fine beams of minimal angular aperture in the zones with high user density, and wide beams of large angular aperture in the zones with low user density. As an example, FIG. 1 shows a multibeam coverage of Australia having very wide beams in the unpopulated zones from the centre to the north and very much finer beams in the coastal regions of the south west and of the south east.

In a satellite adapted to produce a multibeam coverage, the beams are generally generated by antenna systems comprising feed antennas (or simply "feeds"; they are generally horns or sets of horns) and reflectors. Typically, each feed antenna generates a respective beam, while one and the same reflector can contribute to the generation of several distinct beams. The size of a beam depends both on the characteristics of the feed antenna and on those of the reflector; furthermore, a reflector is optimized for a feed having certain characteristics. In practice, different feeds can generate beams of slightly different size using one and the same reflector, but the mismatch between feed and reflector rapidly becomes problematic. Consequently, to be able to generate a multibeam coverage comprising beams of very different sizes (ratio between the surface areas of the footprints on the ground being able to reach, even exceed, a factor of 4) it is necessary to use several different reflectors. That leads to complex and costly antenna systems.

Moreover, the beams of large dimensions exhibit transmission pattern slopes that are a lot less steep than the more directional beams; in other words, their intensity decreases more progressively on moving away from the centre of the beam. Consequently, the "tails" of the beams of large size tend to interfere with the smaller beams.

SUMMARY OF THE INVENTION

The invention aims to remedy, wholly or partly, at least one of the abovementioned drawbacks of the prior art. More particularly, the invention aims to allow for the production of a multibeam coverage by means of an antenna system that is simpler and more readily industrialized, and/or to minimize the interferences between beams. Some embodiments of the invention also make it possible to obtain a greater flexibility in the definition of the beams.

One subject of the invention that makes it possible to achieve these aims is therefore a method for multibeam coverage of a region of the surface of the Earth comprising:
  the generation, by a telecommunications payload embedded on a satellite, of a plurality of radiofrequency beams, called elementary beams (FE1, FE2, FE4);
  the formation of a plurality of radiofrequency beams, called composite beams (FC', FC"), exhibiting footprints on the ground of different sizes, each said composite beam being obtained by the grouping of one or more elementary beams; and
  the transmission or the reception of data through said composite beams, identical data being transmitted or received through all the elementary beams forming one and the same composite beam;
wherein at least one said composite beam is formed by the grouping of a plurality of non-adjacent elementary beams of the same colour, a colour being defined by a frequency band and a polarization state.

Advantageously, the method comprises the introduction of a phase shift between at least two of said elementary beams of the same colour.

Advantageously, said phase shift is a phase inversion.

As a variant, said phase shift is a phase quadrature setting.

Advantageously, a plurality of said elementary beams exhibit footprints on the ground of substantially identical size.

Advantageously, all said elementary beams exhibit footprints on the ground of substantially identical size.

Advantageously, the footprints on the ground of said composite beams have sizes which vary progressively across said region of the surface of the Earth.

Advantageously, all the elementary beams forming one and the same composite beam are generated at the same time.

As a variant, all the elementary beams forming one and the same composite beam are generated in turn.

The invention relates also to a satellite telecommunications payload for the implementation of a predefined method, comprising:
  a plurality of feed antennas (S1-S4);

at least one reflector (R) arranged to cooperate with said feed antennas so as to generate a radiofrequency beam, called elementary beam, for each said feed antenna; and a plurality of transmission or reception modules ($MTR_A$, $MTR_B$) configured to transmit or receive respective data in the form of radiofrequency signals;

each said feed antenna belongs to a grouping of feed antennas, at least some of said groupings comprising a plurality of feed antennas;

each said transmission module is linked to all the feed antennas belonging to one and the same grouping, such that the elementary beams generated by the feed antennas of one and the same grouping form a composite beam;

said groupings of feed antennas being configured such that a plurality of said composite beams exhibit footprints on the ground of different sizes; and the elementary antennas of at least one said grouping are configured to generate non-adjacent elementary beams of the same colour, a colour being defined by a frequency band and a polarization state.

Advantageously, a phase shifter (DΦ) is arranged between at least one elementary antenna of at least one said grouping configured to generate non-adjacent elementary beams of the same colour and the corresponding transmission or reception module.

Advantageously, said or each said phase shifter is a phase inverter.

Advantageously, said or each said phase shifter is configured to perform a 90° phase shift.

Advantageously, said groupings of feed antennas are configured such that all said elementary beams exhibit footprints on the ground of substantially identical size.

Advantageously, at least one said transmission or reception module is equipped with a switch configured to link said module to the corresponding elementary antennas in turn.

BRIEF DESCRIPTION OF THE DRAWINGS

Other features, details and advantages of the invention will emerge on reading the description given with reference to the attached drawings given by way of example and which represent, respectively:

FIG. 3, a telecommunications payload according to an embodiment of the invention.

DETAILED DESCRIPTION

The principle on which the invention is based consists in covering the region of interest with fine beams of identical size—or at the very most having a small number (for example 2 or 3) of different sizes—which can be combined with one another, particularly in the less dense traffic zones, to generate wider "composite" beams. Thus, the beams of larger dimensions are not generated by dedicated reflectors or by feeds mismatched to the size of the reflectors, but by combining fine elementary beams. That offers a number of advantages compared to the prior art:

the antenna system is much simpler and more modular, because it can be composed only of identical feeds and of a small number of reflectors, also identical to one another;

the slopes of the patterns remain steep even for the beams of larger size, minimizing the interferences;

there is greater freedom in the choice of the form of the composite beams; moreover, a composite beam can result from the combination of non-contiguous elementary beams which, as will be explained later, allows a much greater flexibility in the allocation of the spectral and/or power resources.

Figure 1:
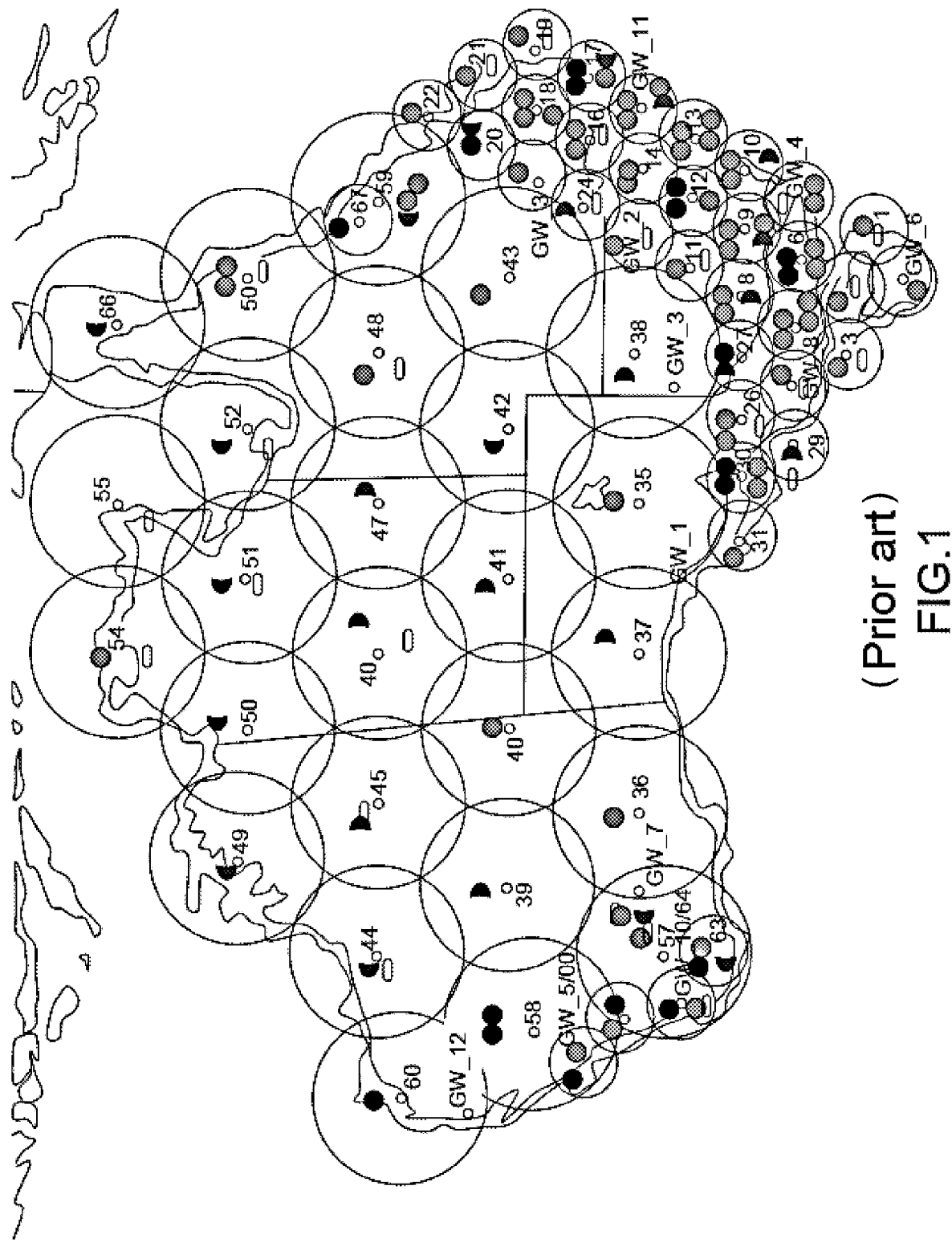
FIG. 1, described above, the multibeam coverage of a region having a greatly variable user density.
Figure 2A:
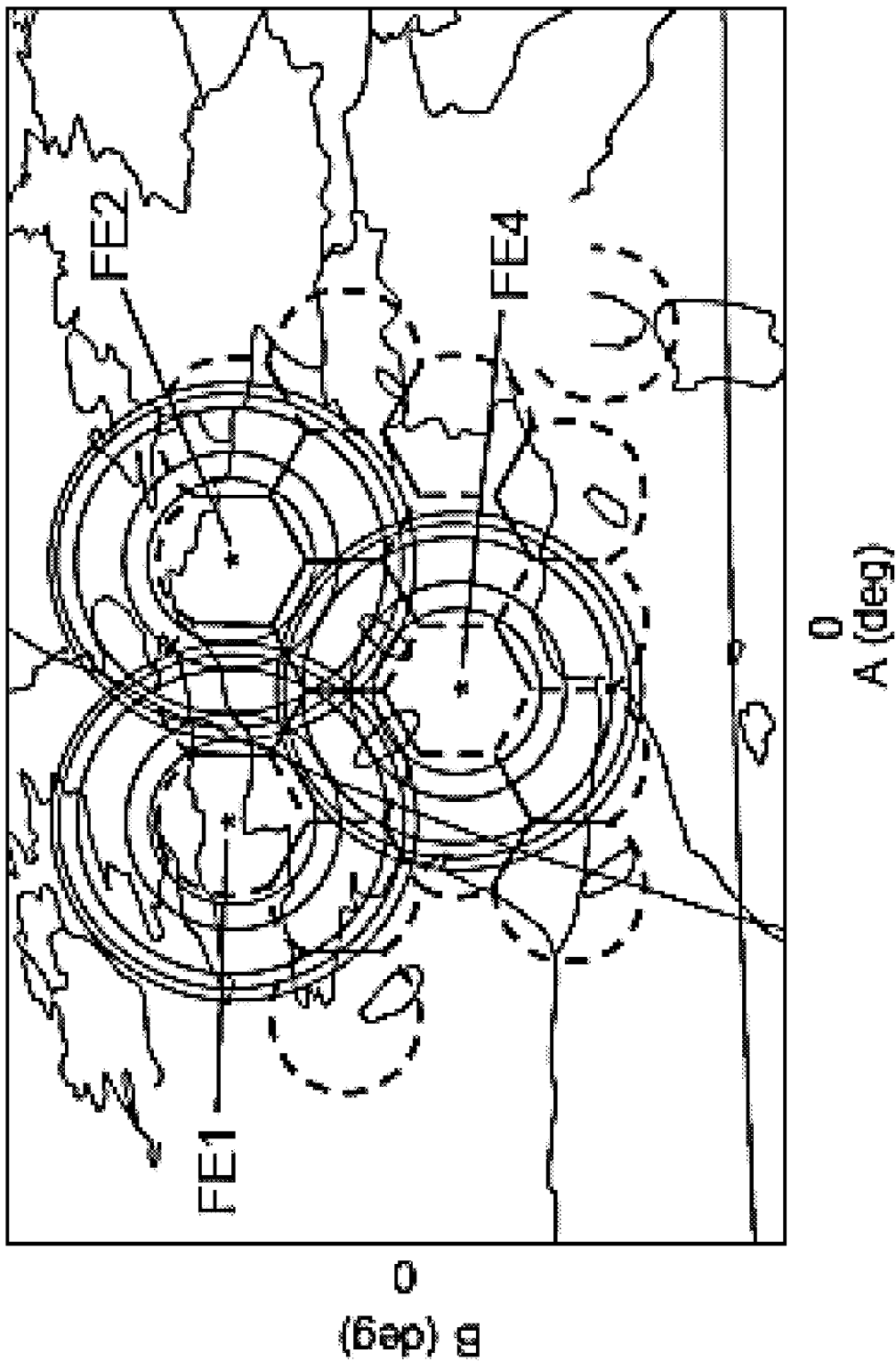
FIGS. 2A to 2C, an embodiment of a multibeam coverage.
Figure 2B:
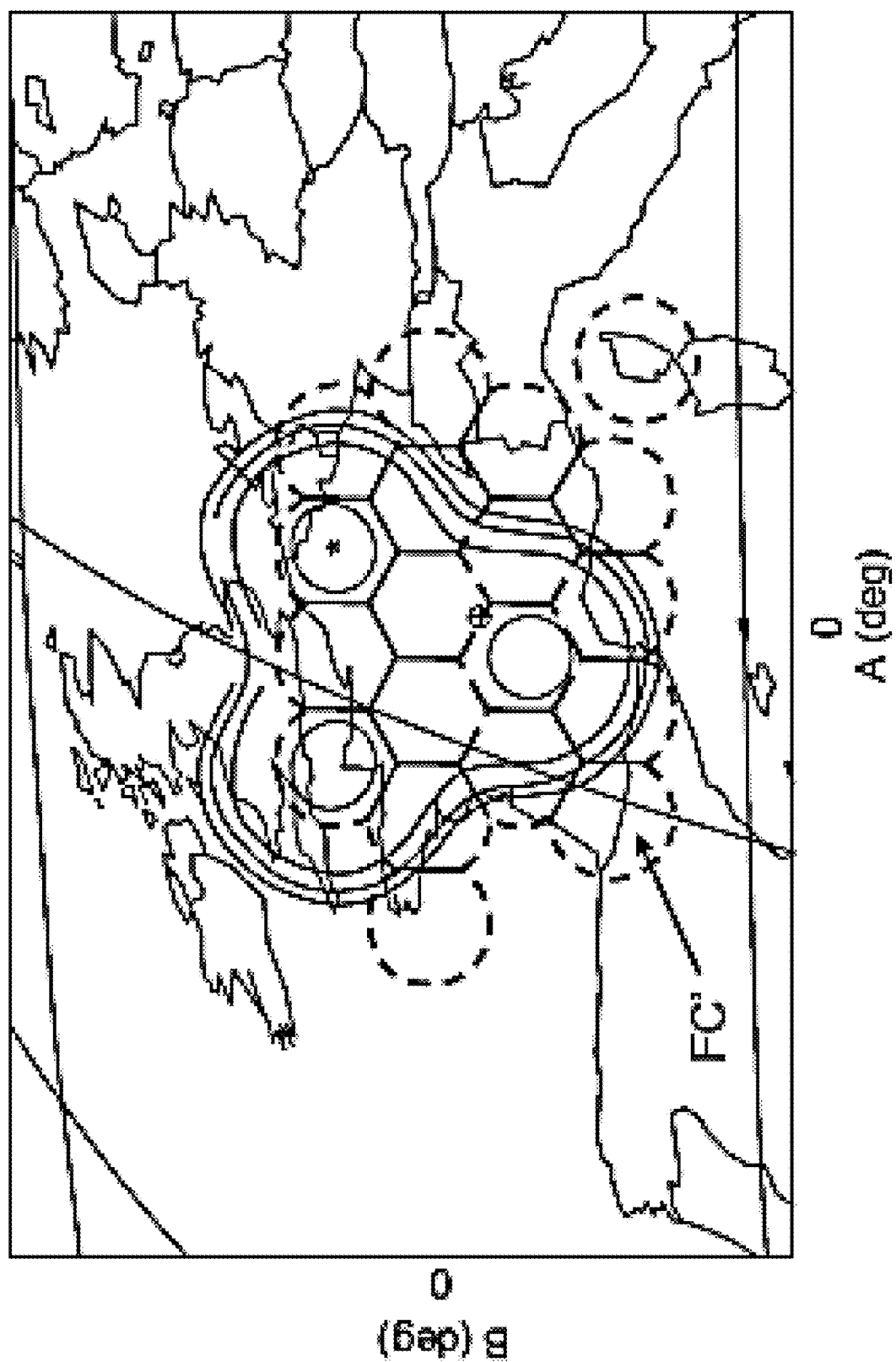
Figure 2C:
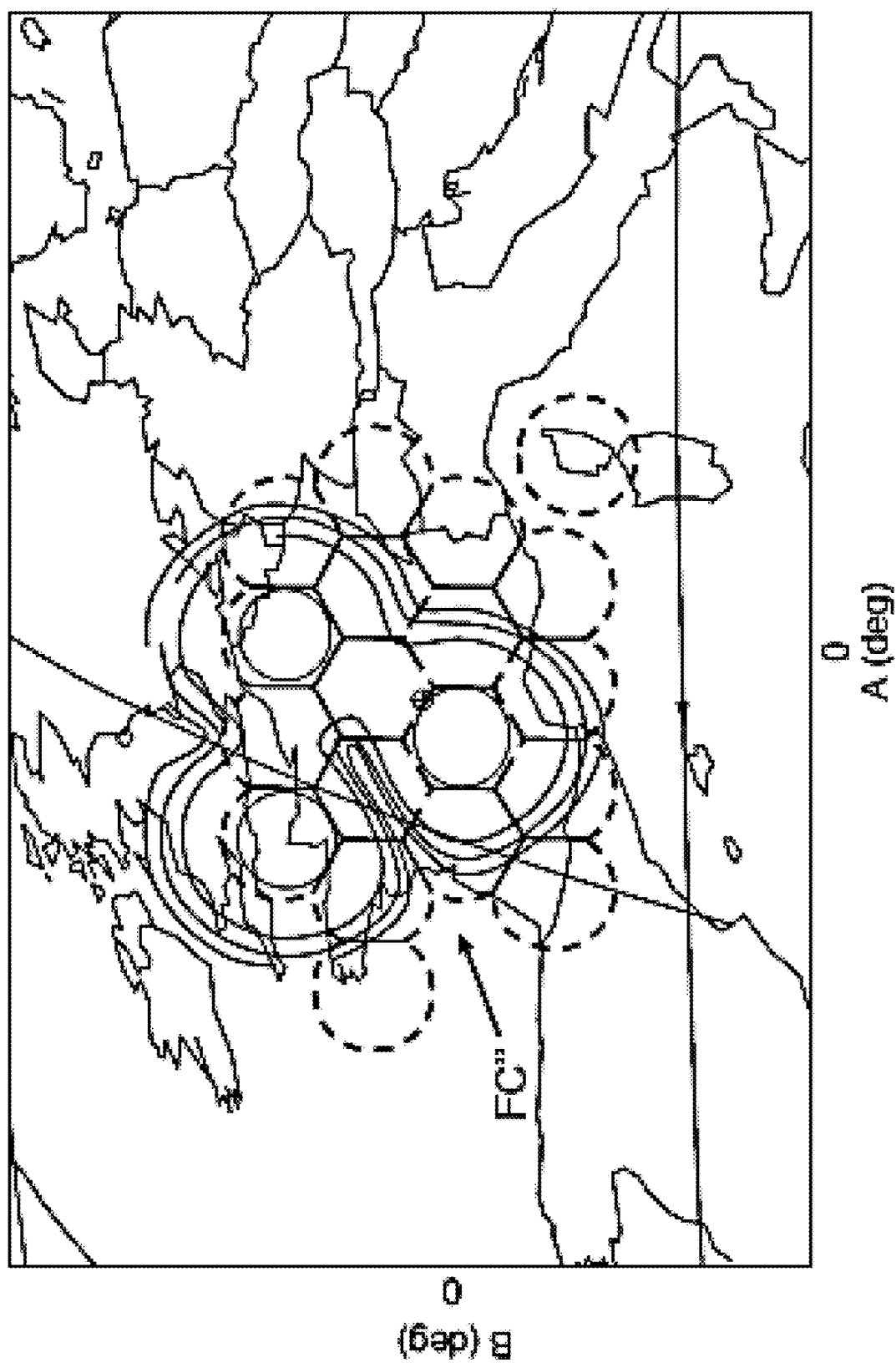

FIGS. 2A to 2C illustrate two variants of a multi-beam coverage in which three non-adjacent elementary beams of the same colour, FE1, FE2 and FE4—whose iso-intensity curves are illustrated in FIG. 2A—are combined to form a composite beam designated by FC' in FIG. 2B and by FC" in FIG. 2C. As in the preceding case, that means that the same data are conveyed by these three elementary beams, in order to serve regions—geographically separate from one another—having a low traffic density. The composite beams FC' and FC" are obtained very simply by connecting the corresponding feed antennas to one and the same power amplifier (in transmission) or low noise amplifier (in reception). In the case of FIG. 2B, the elementary beams of the same colour are summed in phase (so called power summing). In the case of FIG. 2C, however, a 90° phase shifter is introduced between this amplifier and the feed antenna of the elementary beam FE2, and a 180° phase shifter is introduced between this amplifier and the feed antenna of the elementary beam FE4. As can be seen by comparing FIGS. 2B and 2C, the phase opposition between the beams FE1 and FE4 produces a cancellation of fields between the beams FE1 and FE4. The phase quadrature setting of the beams FE1 and FE2, and also of the beams FE2 and FE4, also makes it possible to concentrate the electromagnetic intensity in the regions that have to effectively be covered, by steepening the slope of the radiation pattern of the composite beam, without there being a total cancellation of fields as is the case in phase opposition. The three elementary beams interfere with one another, because they are of the same colour, even though these interferences are moderated by virtue of the spatial separation between beams. The introduction of such phase shifts loses benefit when the elementary beams are so far apart that their interference becomes negligible.

More complex configurations, associating several beams—and if appropriate with phase shifts different from 90° and 180° between them—are of course possible.

It is also possible to produce composite beams combining non-adjacent elementary beams of different colours.

The forming of the "unconnected" composite beams from non-adjacent elementary beams can prove advantageous from the point of view of resource management. In fact, in a composite beam, several distinct geographic regions share the same resources: frequencies, power, even transmission time, as will be explained later. If these regions are far apart from one another, their meteorological conditions will be decorrelated: if, for example, the region covered by the elementary beam FE1 has conditions of strong attenuation because of a storm, the attenuation will probably be lesser in the regions covered by FE2 and FE4. It will therefore be possible to assign more resources to FE1 without excessively degrading the service offered by FE2 and FE4. In the case of adjacent beams, that is more difficult because of the high correlation between the meteorological conditions between nearby regions. If the elementary beams are very far apart from one another, it will even be possible to exploit a time zone differential between the corresponding regions, by removing resources from the beams covering regions in "off-peak hours" for the benefit of those forming part of the same composite beam and covering regions in "peak hours".

Hitherto, the only case to have been considered is the one in which data cross at the same time through all the elementary beams of one and the same composite beam, these elementary beams sharing the frequency and power resources assigned to the composite beam. As a variant, it is possible to activate in turn the various elementary beams of one and the same composite beam, by means of a switch arranged in the payload of the satellite. Thus, each elementary beam uses—but only for a fraction of time—all of the available resources.

The composite beam has a solid angle that is a multiple of a number n of elementary beams. Given the division, the directivity is reduced by a factor 10·log(n) in dB. When n is too high, the variation of directivity between an elementary beam and a composite beam can be significant and generate a variation of the signal ratio C of the composite beam that is proportional to n and therefore a reduction of the level of C/I, I being the interfering signals with the same frequency and polarization, originating from uncoupled elementary beams.

The elementary beams adjacent to a large composite beam can thus potentially degrade the signal-to-noise ratio (C/I) of the composite beam. To avoid the degradation of the signal-to-noise ratio, it can be advantageous to couple a limited number of elementary beams in a composite beam, in immediate proximity to elementary beams external to the composite beam. For example, a composite beam composed of two elementary beams can be adjacent to an elementary beam. By progressively varying the sizes of the footprints on the ground of the composite beams, the abrupt signal transitions in the signal-to-noise ratio are thus avoided.

FIG. 3 illustrates, very schematically, the structure of a telecommunications payload, embedded on a satellite, allowing for the production of a multibeam coverage as described above. Such a payload, given purely as a nonlimiting example, comprises:

two transmission or reception modules—$MTR_A$ and $MTR_B$—to generate the signals that have to be transmitted via respective composite beams (in transmission) or to acquire the signals received by these beams (in reception). Each transmission or reception module comprises at least one power and/or low-noise amplifier.

Four feed antennas S1-S4 (electromagnetic horns) intended to each generate a respective elementary beam.

A reflector R cooperating with the feed antennas to generate said beams.

In reality, an antenna system according to the invention typically comprises several reflectors and a much higher number of feed antennas.

The module $MTR_A$ is linked to three feed antennas S1, S2, S3 to produce an "unconnected" composite beam, of the type of FIGS. 2A to 2C. A phase shifter DΦ is arranged between the module and the feed antenna S3.

Finally, the module $MTR_B$ is linked to a single feed antenna, S4, to produce a fine "composite" beam, composed of a single elementary beam.

It will be noted that the antenna system of the payload represented in FIG. 3 comprises only feed antennas that are identical to one another, cooperating with a single reflector (or identical reflectors). It is therefore a structure that is simpler and more modular than that of a conventional multibeam antenna system, comprising feed antennas and/or reflectors of differing sizes.

Each satellite elementary/composite beam, contemplated herein, has a footprint/contours of constant power density with decreasing value from the center to the edge of the beam, e.g., 51.0, 48.0, 40.0, 35.0, and 30.0 dBi.

The invention claimed is:

1. A method for multibeam coverage of a region of the surface of the Earth, the method comprising:
    the generation, by a telecommunications payload embedded on a satellite, of a plurality of radio frequency beams, called elementary beams;
    the formation of a plurality of radio frequency beams, called composite beams, exhibiting footprints on the ground of different sizes, each said composite beam being obtained by combining at least two elementary beams through a plurality of feed antennas and at least one reflector, the at least one reflector being configured to spatially isolate the at least two elementary beams from each other;
    the transmission or the reception of data through said composite beams, the data being transmitted or received through all the elementary beams forming one and the same composite beam; and
    the introduction of a phase shift between at least two of a plurality of non-adjacent elementary beams of said composite beam, said non-adjacent elementary beams being of a same colour,
    wherein said phase shift is a phase inversion or a phase quadrature setting, and
    wherein at least one said composite beam is formed by combining the plurality of non-adjacent elementary beams of the same colour, a colour being defined by a frequency band and a polarization state.

2. The method according to claim 1, wherein a plurality of said elementary beams exhibit footprints on the ground of identical size.

3. The method according to claim 2, wherein all said elementary beams exhibit footprints on the ground of identical size.

4. The method according to claim 1, wherein all the elementary beams forming one and the same composite beam are generated at the same time.

5. The method according to claim 1, wherein all the elementary beams forming one and the same composite beam are generated in turn.

6. A satellite telecommunications payload, comprising:
    a plurality of feed antennas;
    at least one reflector arranged to cooperate with said feed antennas so as to generate a radio frequency beam, called elementary beam, for each said feed antenna; and
    a plurality of transmission modules configured to transmit respective data in the form of radio frequency signals;
    wherein:
        each said feed antenna belongs to a grouping of feed antennas, at least some of said groupings comprising a plurality of feed antennas;
        each said transmission module is linked to all the feed antennas belonging to one and the same grouping, such that the elementary beams generated by the feed antennas of one and the same grouping form a composite beam;
        said groupings of feed antennas being configured such that a plurality of said composite beams exhibit footprints on the ground of different sizes;
        the elementary antennas of at least one said grouping are configured to generate non-adjacent elementary beams of the same colour, a colour being defined by a frequency band and a polarization state; and
        a phase shifter is arranged between at least one elementary antenna of at least one said grouping configured to generate non-adjacent elementary beams of the same colour and the corresponding transmission module, and wherein each said phase shifter is a phase inverter or is configured to perform a 90° phase shift.

7. The telecommunications payload according to claim 6, wherein said groupings of feed antennas are configured such that all said elementary beams exhibit footprints on the ground of identical size.

8. The telecommunications payload according to claim 6, wherein at least one said transmission or reception module is equipped with a switch configured to link said module to the corresponding elementary antennas in turn.

9. A satellite telecommunications payload, comprising:
a plurality of feed antennas;
at least one reflector arranged to cooperate with said feed antennas so as to generate a radio frequency beam, called elementary beam, for each said feed antenna; and
a plurality of reception modules configured to receive respective data in the form of radio frequency signals;
wherein:
each said feed antenna belongs to a grouping of feed antennas, at least some of said groupings comprising a plurality of feed antennas;
each said reception module is linked to all the feed antennas belonging to one and the same grouping, such that the elementary beams generated by the feed antennas of one and the same grouping form a composite beam;
said groupings of feed antennas being configured such that a plurality of said composite beams exhibit footprints on the ground of different sizes;
the elementary antennas of at least one said grouping are configured to generate non-adjacent elementary beams of the same colour, a colour being defined by a frequency band and a polarization state; and
a phase shifter is arranged between at least one elementary antenna of at least one said grouping configured to generate non-adjacent elementary beams of the same colour and the corresponding reception module, and
wherein each said phase shifter is a phase inverter or is configured to perform a 90° phase shift.

10. The telecommunications payload according to claim 9, wherein said groupings of feed antennas are configured such that all said elementary beams exhibit footprints on the ground of identical size.

11. The telecommunications payload according to claim 9, wherein at least one said reception module is equipped with a switch configured to link said module to the corresponding elementary antennas in turn.

* * * * *